Sept. 20, 1966    C. W. HATCHER    3,273,939
CONCRETE SAWING MACHINE
Filed Feb. 4, 1964    6 Sheets-Sheet 1

INVENTOR.
CECIL W. HATCHER
BY
*W E Beatty*
ATTORNEY

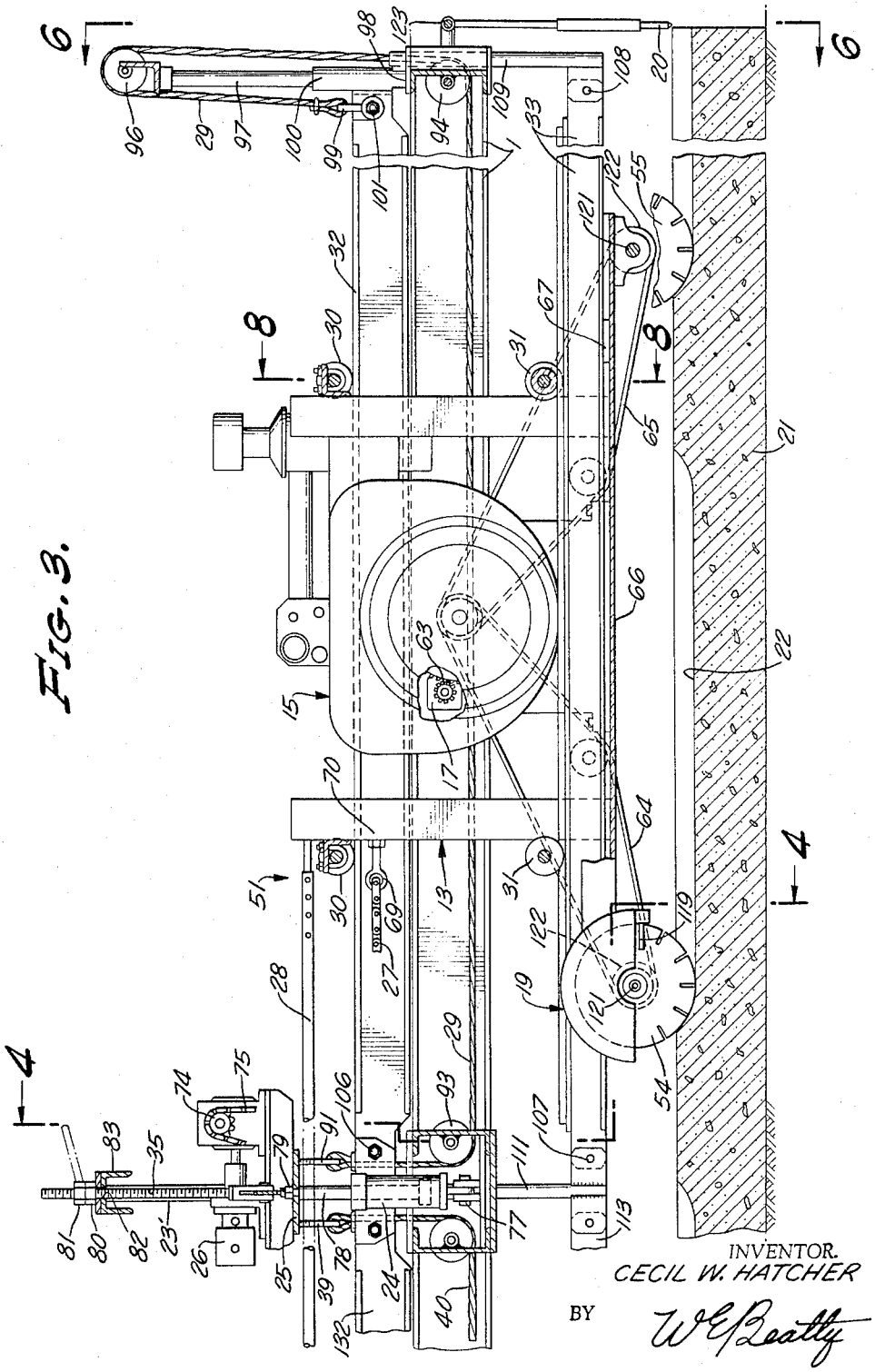

Sept. 20, 1966     C. W. HATCHER     3,273,939
CONCRETE SAWING MACHINE
Filed Feb. 4, 1964     6 Sheets-Sheet 3
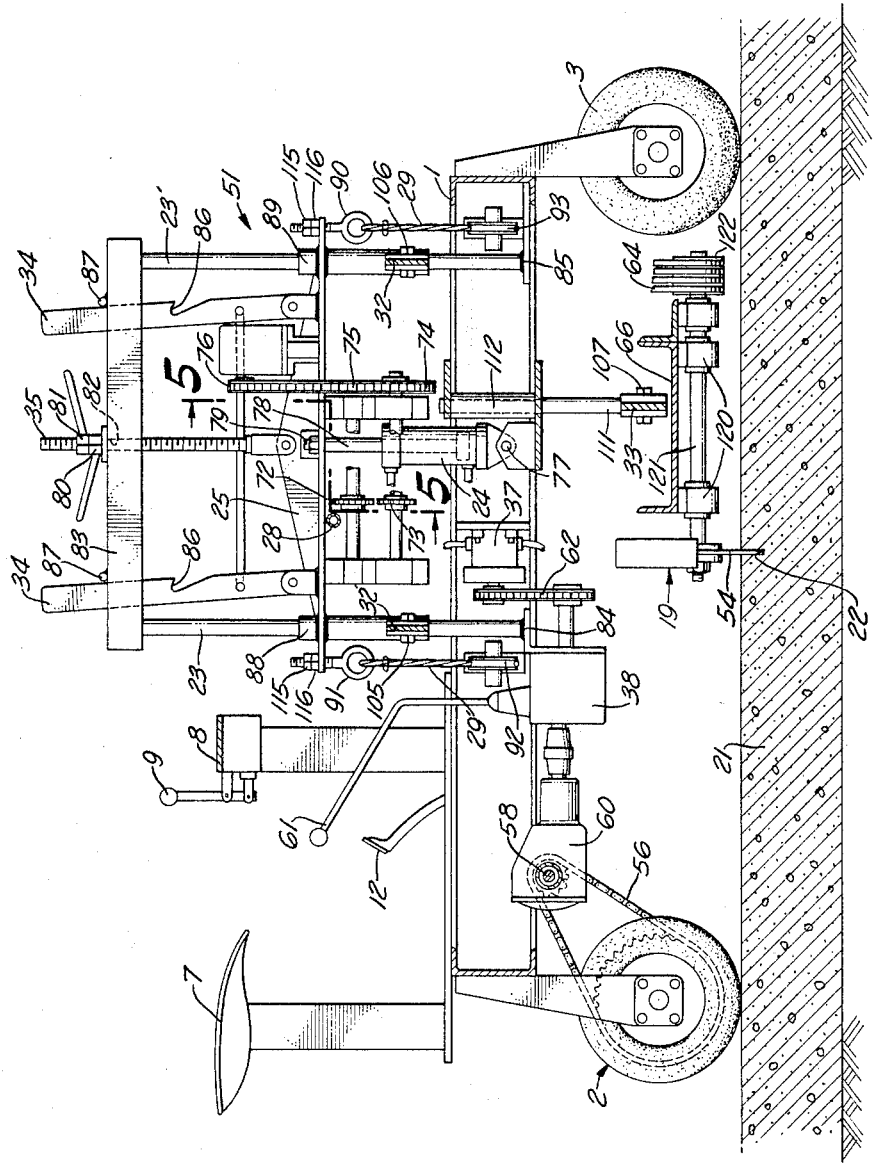
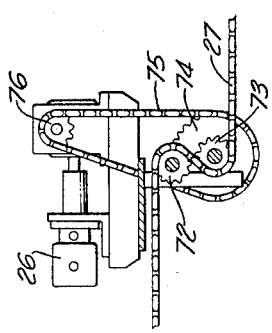
INVENTOR.
CECIL W. HATCHER
BY W. E. Beatty
ATTORNEY INVENTOR.
CECIL W. HATCHER
BY W. E. Beatty
ATTORNEY

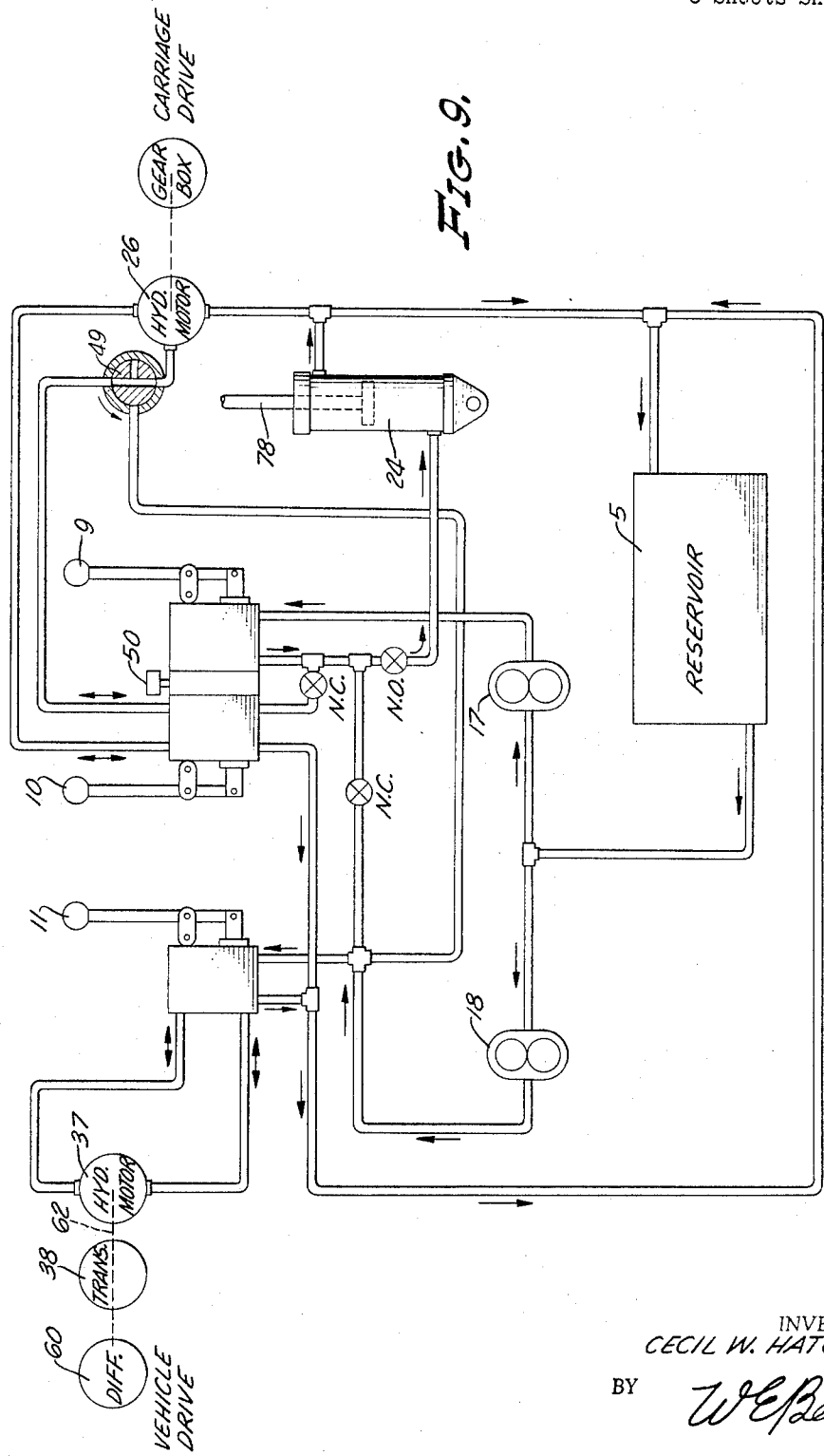

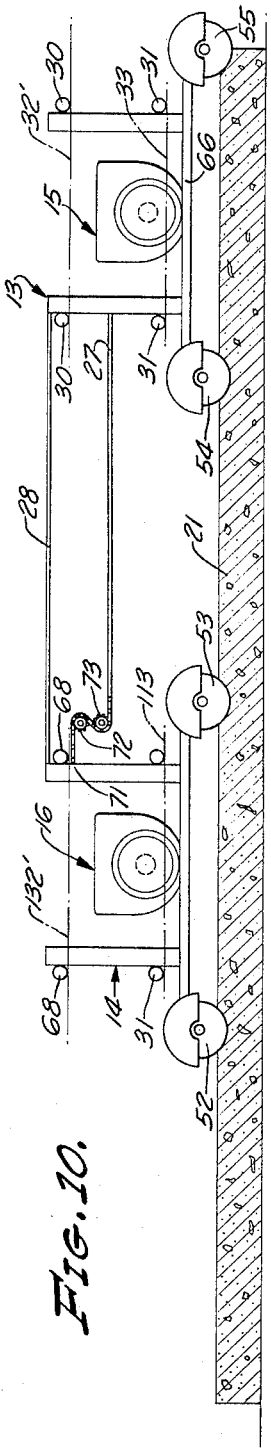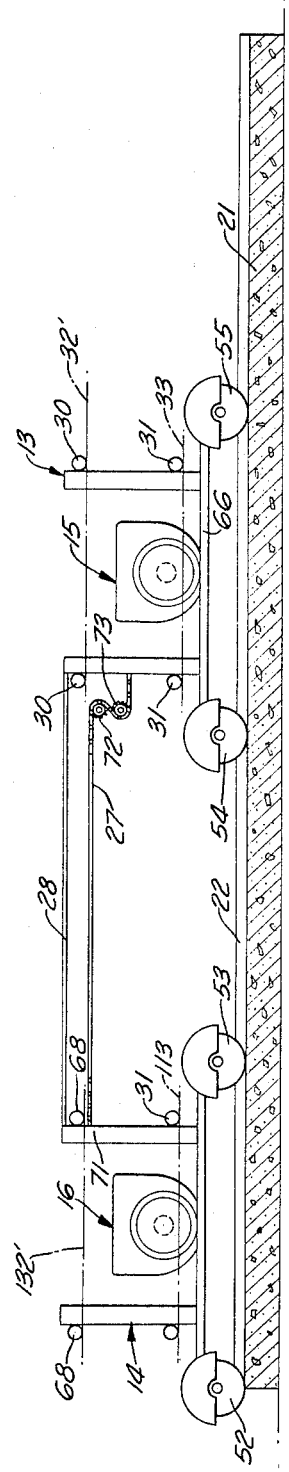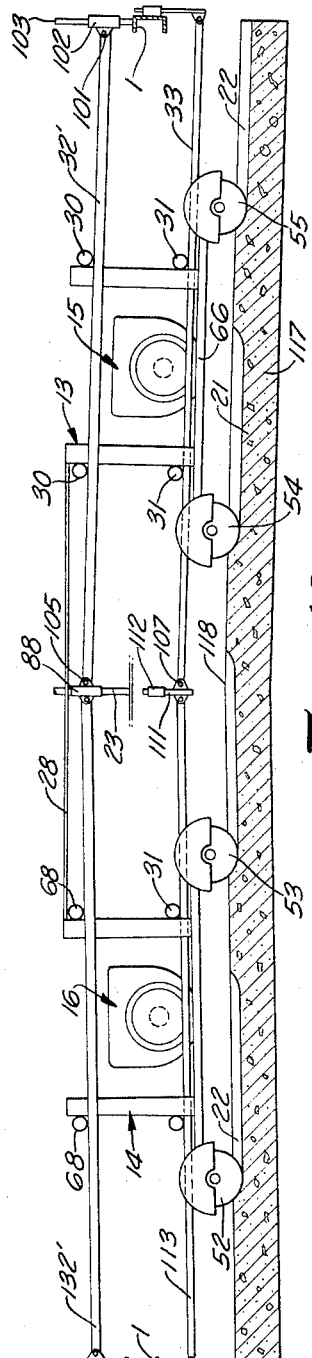

United States Patent Office 3,273,939
Patented Sept. 20, 1966

3,273,939
CONCRETE SAWING MACHINE
Cecil W. Hatcher, West Covina, Calif., assignor to
Concut, Inc., El Monte, Calif., a corporation of
California
Filed Feb. 4, 1964, Ser. No. 342,431
14 Claims. (Cl. 299—39)

This invention relates to a concrete sawing machine, and more particularly, to a machine for sawing a contraction joint in a concrete pavement or highway.

The present invention is an improvement on the machines of U.S. Patents 2,791,412, dated May 7, 1957 and 3,007,688 dated Nov. 7, 1961.

An object of the present invention is to simplify and improve the construction of my prior machines.

A feature of the present invention is the provision of two sets of saw blades which are angularly adjustable in an upright direction so as to cut a pavement having a crown or sections which are not level but extend at an angle to each other. The invention provides means for adjusting the angular relation between the sets of saws and the alignment of the saws.

A further object of the invention is to stabilize the carriage for the saws. This is accomplished by providing a three-track suspension for the saw carriage, a third and lower rail acting to hold the carriage and its saws on a straighter line than heretofore.

A further object is to avoid the use of an engine for propelling a vehicle as in Patent 3,007,688. This is accomplished by eliminating this engine and by propelling the vecihle by a hydraulic motor driven by pumps driven by the engines which traverse the saw blades and rotate them.

Other improvements will be apparent from the following description wherein:

FIG. 3 is a longitudinal section taken on the line 3—3 of FIG. 1.

FIG. 4 is a transverse section taken on the line 4—4 of FIG. 3.

FIG. 5 is a detail sectional view as indicated by the line 5—5 of FIG. 4.

FIG. 9 is a flow diagram of the hydraulic control system.

FIGS. 10 and 11 are diagrammatic views showing relative starting and finishing positions of the cutting wheels, or saws.

FIG. 12 is a diagrammatic view similar to FIGS. 10 and 11 but showing the machine as used on a crowned pavement.

Figure 1:
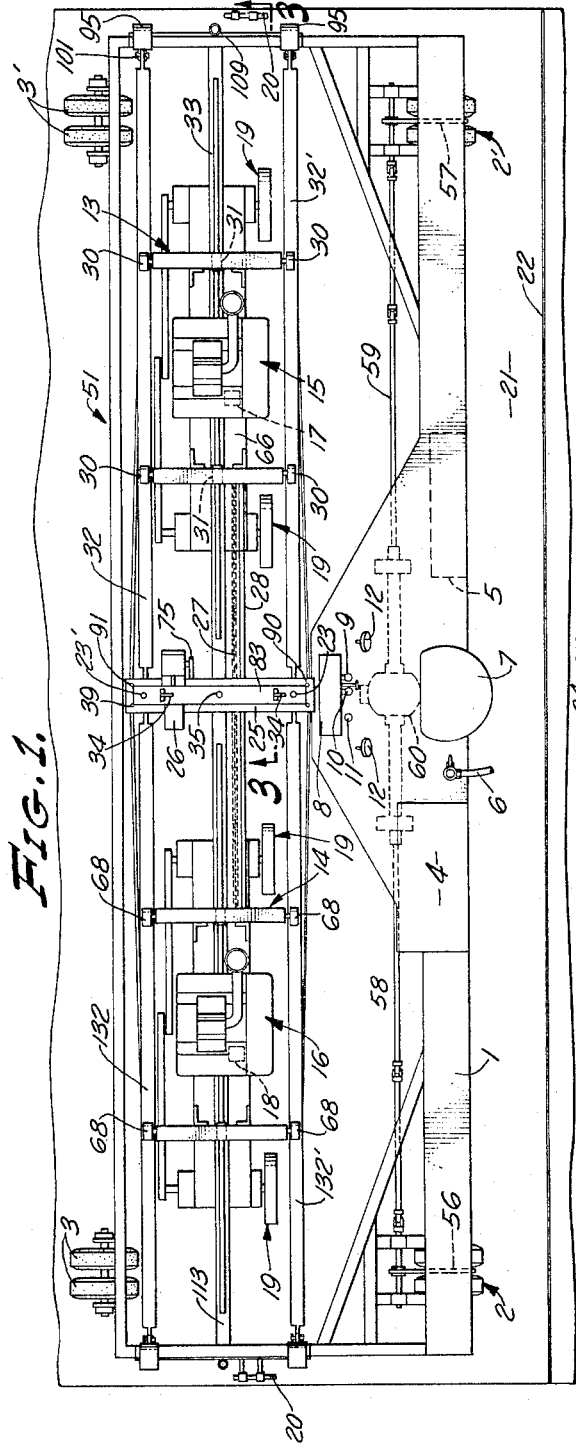
FIG. 1 is a plan view of the machine as related to a strip of concrete pavement.
Figure 2:
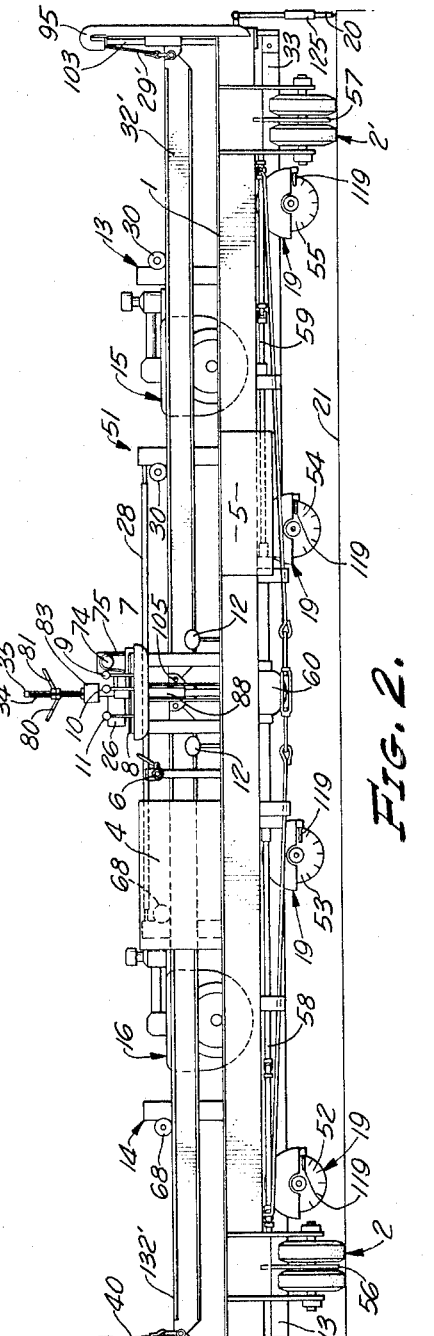
FIG. 2 is a rear elevation.

The operator sits on the seat 7 FIG. 4, supported by the vehicle and controls the handles 9, 10 and 11 and the metering valve 50, FIG. 9, to control the vehicle 51 and the saws 52, 53, 54, 55, FIG. 2. The vehicle has a main frame 1 supported for travel on a highway or pavement 21 by front wheels 3, 3', FIG. 1, which are not driven, and by rear wheels 2, 2', which are driven, each having a drive chain 56, 57 for shafts 58, 59, oppositely extending from differential 60 having transmission 38 having the usual shift lever 61 in front of seat 7.

Transmission 38 has a chain drive 62 with the hydraulic motor 37 on main frame 1.

Steering is accomplished by means of brake pedals indicated at 12 in FIG. 1. Either pedal may be locked for steering, as is well known.

In FIG. 9, hydraulic pump 18 drives hydraulic motor 37. Hydraulic pump 17 drives hydraulic motor 26 which drives the carriages 13, 14 and also supplies fluid pressure to the hydraulic cylinder 24. As shown in FIG. 1, pump 17 is driven by engine 15 and pump 18 is driven by engine 16. The pumps 17 and 18 may be driven from the flywheels of their respective engines by gear as shown at 63 in FIG. 3.

Figure 8:
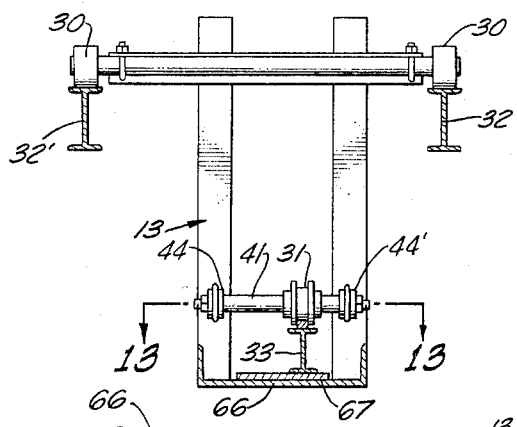
FIG. 8 is a detail sectional view taken on line 8—8 of FIG. 3, showing 3-point suspension for the carriage.

Saws 54 and 55 and engine 15 which drives them by belts 64 and 65, are carried by a carriage 13 having two pairs of upper rollers 30 which ride on parallel support beams, or tracks, indicated at 32, 32' and a lower flange guide roller 31 which embraces lower guide rail or track 33, see FIG. 8. As shown in FIG. 8, carriage 13 includes a bottom flange member 66 which underhangs the beam or track 33. Member 66 has a wear block or shoe 67. The other side of the machine has a similar carriage 14 for engine 16 and its saws 52, 53.

As shown in FIG. 1, carriage 14 has two sets of upper rollers indicated at 68 like the rollers 30 for carriage 13. The rollers 68 ride on parallel tracks 132, 132' which are in effect extensions of the tracks 32, 32', respectively, although the two sets of saws and their carriages 13, 14 may be tilted with respect to each other to make a cross cut in a pavement having a crown as indicated in FIG. 12. The saws remain in the same vertical plane for different tilt adjustments.

Figure 13:
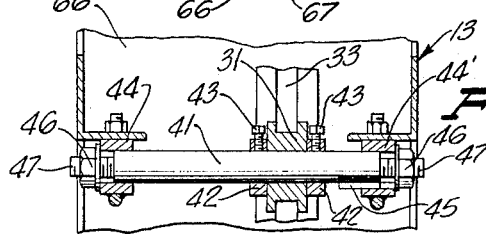
FIG. 13 is a horizontal sectional view on line 13—13 of FIG. 8.

FIG. 13 is a horizontal sectional view as indicated on the line 13—13 of FIG. 8, and illustrates the manner in which the carriages and saw assemblies may be shifted to line up the saw blades of both carriages so that they are in the same vertical plane to cut aligned slots in the pavement. 41 is the guide roller shaft which supports guide roller 31 between collars 42 which hold this roller from longitudinal movement on the shaft by means of set screws 43. Shaft 41 is mounted in support sleeves 44 and 44' mounted to carriage 13 and is fixed against rotation by key 45. The ends of the shaft are threaded as at 47 to receive nuts 46. Coarse adjustment of the saw assembly can be effected by shifting collars 42 on the shaft. Fine adjustment is made by loosening one of the nuts 46 and tightening the other. The adjustment described above, as shown in FIG. 13 is used for the guide roller at each end of each carriage 13 and 14.

The carriages 13 and 14 are traversed on their respective tracks by means of hydraulic motor 26, as shown in FIG. 9, also FIGS. 1 and 5. One end of chain 27 is fixed to an eye bolt 69 fixed to carriage 13, as shown at 70, see FIG. 3. The other end of chain 27 is fixed to carriage 14 in a similar manner as indicated at 71 in FIG. 10 which also shows that the adjacent ends of carriages 13 and 14 are rigidly connected by a tie bar 28 so that a tension at one end of the chain will communicate a thrust to the other carriage and keep the carriages a fixed distance apart.

As shown in FIG. 5, chain 27 makes an S bend around idler sprocket 72 and sprocket 73 on sprocket 74 driven by chain 75 driven by sprocket 76 driven by the carriage motor 26 supported by frame 25.

As shown in FIG. 3, the center of main frame 1 has a hinge connection 77 with the upright hydraulic cylinder 24 having a plunger 78, the upper end of which is fixed, as indicated at 79 to the frame 25, see also FIG. 4. Frame 25 is suspended by a threaded rod 35 having adjustable wing nuts 80, 81, for limiting the depth to which the frame 25 and associated parts can drop. Rod 35 passes through an aperture 82 in the cross head 83 carried by parallel posts 23, 23' which arise from and are fixed to the main frame 1 as indicated at 84, 85. While adjusting the vertical position of frame 25 by operating nuts 80, 81, it may be fixed in elevated position by the safety latches 34, each having a notch like 86 for a catch 87.

Frame 25 has sleeves 88, 89 which ride on the posts 23, 23'. The inner end of track 32' is connected by hinge 105 to sleeve 88 and the inner end of track 32 is similarly connected by hinge 106 to sleeve 89. As frame 25 is raised or lowered by plunger 78, operated by cylinder 24, the inner ends of tracks 32, 32' are raised or lowered and through the cables 29, 29', the outer ends of these tracks are raised and lowered correspondingly. As carriage 13 underhangs the lower stabilizer track 33, this track is raised or lowered a corresponding amount, whereby these three tracks remain parallel to each other for all vertical adjusted positions.

As shown in FIG. 3, the lower track 33 has a hinge connection 107 with post 111 slidably mounted in sleeve 112 fixed to the main frame 1, see FIG. 4. The corresponding lower track 113 at the other side of the machine has a similar hinge connection 114 with post 111, see FIG. 3, and its outer end has a hinge connection 108 with a rod 109 having a slide bearing 110 fixed to the frame 1.

Figure 6:
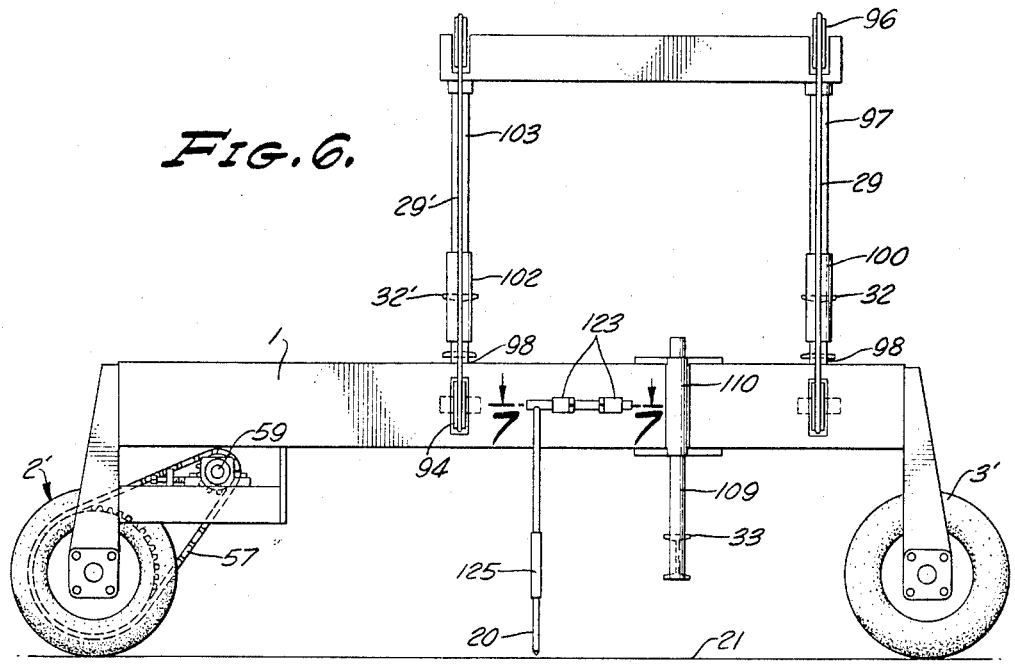
FIG. 6 is an end elevation taken on line 6—6 of FIG. 3.

Frame 25, at its outer ends has adjustable eye bolts 90, 91 for cables 29, 29', each passing around a pulley like 92, 93, (FIG. 4) carried by the main frame 1. As shown in FIG. 3, cable 29 passes from pulley 93 at the center portion of main frame 1 to pulley 94 at the outer margin of frame 1 and then through a guide 95 and around pulley 96 carried by beam 104 (FIG. 6) supported by posts 97, 103 arising from and fixed to main frame 1 as indicated at 98 in FIG. 3, the cable being fixed to a clevis 99 carried by the outer end of the track or support beam 32. The outer end of track 32 has a sleeve 100 which slides on post 97, having a hinge connection 101 therewith and loose play to permit some tilt movement of track 32 in a vertical plane. As shown in FIG. 6, the outer end of track 32' has a similar sleeve 102 which slides on post 103 like post 97.

As shown in FIG. 4, the eye bolts 90, 91 are adjusted in vertical position on frame 25 by means of nuts 115, 116 to vary the length of their respective cables 29, 29' to adjust the elevation of the outer ends of tracks 32, 32' with respect to their inner ends. FIG. 12 shows the outer ends of the tracks for carriages 13 and 14 at a lower elevation than their inner ends by adjusting the length of their cables, as above described, to cut a pavement 117 having a crown 118. The saws of both carriages 13 and 14 are in a vertical plane and they travel in a path crosswise of the pavement and crosswise of the travel of the vehicle 51 which is operated to different stations along the pavement so as to cut transverse contraction joints at selected intervals.

In FIG. 9, the handles 9, 10 and 11 control valves to control flow from pumps 17 and 18 to the motors 26 and 37 and cylinder 24, with exhaust to reservoir 5. Handle 9 is moved forward to operate cylinder 24 and raise the frame 25 and the three tracks at each side of the machine and carriages 13 and 14 with their engines and saws. A suitable valve is operated to lower the carriages. Handle 10 is moved forward to move the carriages to the left and this handle is moved to the rear to move the carriages to the right by operating motor 26. Handle 11 operates motor 37 to propel the vehicle forward or backward. Valve 50 controls the speed of both carriages.

In FIGS. 1 and 2, 4 is a fuel tank and 6 represents a water inlet supplied by a tank truck to supply water to a nozzle 119 for each saw blade. As shown in FIG. 1, the handles or levers 9–11 are arranged on control panel 8 at the operator's position.

The bottom of carriage 13 is a "U" channel, as shown in FIG. 4, and suspended from it are suitable bearings like 120 for the shaft or spindle 121 of the saws like 54, the saw being at one end of the shaft, or spindle, and the pulley 122 for belt 64 being at its other end. A similar saw assembly on channel 66 is provided for the saw 55, the carriage 14 and its saw assemblies for saws 52, 53 being similar to that described.

Figure 7:
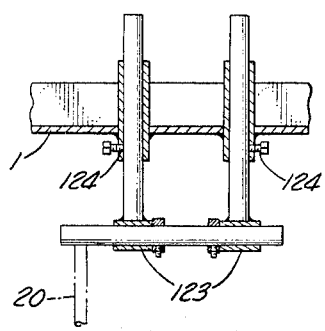
FIG. 7 is a detail sectional view of the pointer taken on line 7—7 of FIG. 6.

In FIG. 3, also FIGS. 1, 6 and 7, a pointer 20, at opposite ends of the machine, is supported for hinge movement about a pivot 123 having a sleeve 125 for height adjustment and longitudinal and horizontal adjustment 124. The saw assembly swings pointer 20 away at the start.

In FIGS. 3 and 4, 22 represents a saw cut made by saw 54, while FIG. 2 shows the saws 52 to 55 in elevated position. FIG. 11 shows the finish of the cut and the overlap of the cut by carriage 13 with the cut by carriage 14 to result in a continuous cut across the full width of the roadway.

As apparent from FIG. 2, engine 15 is suspended by its carriage 13 by the upper tracks 32, 32' having a center of gravity below the upper tracks and above the lower stabilizing track 33. The same applies to engine 16.

FIG. 3 shows one bolt 91 of the pair, 90, 91 on frame 25, appearing in FIG. 4 for cables 29, 29' extending to the outer ends of the tracks 32, 32' at the right hand side of the machine. Frame 25 also has a similar pair of bolts, one of which appears at 39 in FIG. 3 for its cable 40, at left hand side of the machine, for a similar pair of cables supporting the outer end of tracks 132, 132'.

Preferably, a three-way valve 49 is added in the supply line to motor 26, as shown in FIG. 9. This enables the pressure of pump 17 to be added to that supplied by pump 18 to drive vehicle motor 37 at a faster rate of speed. It is necessary to operate both controls 10 and 11 to direct the fluid pressure to the proper lines supplying both valve 49 and motor 37.

I claim:
1. A concrete sawing machine comprising a vehicle having a main frame, a central support arising from said frame, a track means laterally extending from opposite sides of said central support, an outer support on said frame for the outer end of each of said track means, means providing a tilt connection between each end of each track means and its respective supports, a carriage for each of said track means, each carriage having a power driven saw spindle means for traversing said carriages on their said track means, means for raising or lowering said track means, and means for adjusting the upright tilt of each of said track means with respect to the other track means.

2. A concrete sawing machine according to claim 1, said tilt adjusting means comprising a cable suspension for each of said track means, each suspension including a cable having end portions connected to said central support and to the outer end of each of said track means, and means for adjusting the length of each cable.

3. A concrete sawing machine according to claim 1, said traversing means comprising a tie bar between said carriages, a chain connecting said carriages, a sprocket on said central support for driving said chain, and a motor on said central support for driving said sprocket.

4. A concrete sawing machine according to claim 1, each of said track means including parallel upper tracks providing a suspension for its carriage and a lower stabilizing track, each carriage means resisting side thrust, a sliding support for the opposite ends of each lower track, each carriage having a supporting connection with its lower track.

5. A concrete sawing machine according to claim 1, said central support comprising spaced guide posts arising from said frame, a crosshead for said posts, a horizontal frame member having upright sleeves each slidable on one of said posts, the inner end of each of said track means having a hinge connection with one of said sleeves, a plunger means for raising or lowering said frame member and stop means cooperating with said crosshead for limiting the lower portion of said frame member and said track means.

6. A concrete sawing machine according to claim 1, said central support comprising spaced guide posts arising from said frame, a crosshead for said posts, a horizontal frame member having upright sleeves each slidable on one of said posts, the inner end of each of said track means having a hinge connection with one of said sleeves, a hydraulic cylinder on said frame having a plunger for raising or lowering said frame member, a safety latch for said frame member on said crosshead, and adjustable stop means cooperating with said crosshead for limiting the lower position of said frame member.

7. A concrete sawing machine according to claim 1, said central support comprising spaced guide posts arising from said frame, a crosshead for said posts, a horizontal frame member having upright sleeves each slidable on one of said posts, the inner end of each of said track means having a hinge connection with one of said sleeves, a hydraulic cylinder on said frame having a plunger for raising or lowering said frame member, said outer support comprising upright posts each having a slidable sleeve having a hinge connection with the outer end of one of said track means, said outer posts each having a pulley for a cable connected at one end to the outer end of the track means, each cable having other pulleys on said main frame with the other end of the cable connected to an eye bolt, each eye bolt having an adjustable support on said frame member for adjusting the length of the cable and the tilt of the track means.

8. A concrete sawing machine comprising a vehicle having a main frame, a central support arising from said frame, a track means laterally extending on opposite sides of said central support, a slide bearing on said central support for the inner end of each of said track means, a terminal support on said frame for a slide bearing for the outer end of each of said track means, a hinge connection on a horizontal axis between each end of each track means and its said slide bearings, means for adjusting the tilt of each of said track means with respect to the other track means, a carriage for each of said track means, each carriage having a power driven set of saws, said sets of saws being in position to make a continuous cut, means for traversing said carriages on their track means, and means for raising or lowering said track means to bring said saw means into or out of cutting relation with the pavement.

9. A concrete sawing machine comprising a vehicle having a main frame having driven wheels, a track at opposite sides of said machine, a hydraulic cylinder and plunger means mid-way of said tracks for raising or lowering said tracks as a unit, each track having parallel track members, cooperating upright sliding supports on said frame and at each end of each track member, each track having a carriage having an engine coupled to a saw spindle means, a hydraulic pump driven by each of said engines, said pumps supplying fluid pressure to a hydraulic motor having a drive for said vehicle wheels and a pressure supply for said cylinder and for a drive for said carriages.

10. A concrete sawing machine comprising a vehicle having a main frame, a track means on said main frame, said track means including upper parallel tracks and a lower guide rail, a carriage having a roller suspension on said upper tracks and a guide roller fore and aft for said guide rail, said carriage having an axle for each guide roller, means for adjusting the angular relation of each axle with respect to said carriage, a saw spindle on said carriage and means on said carriage for driving said saw spindle, said adjusting means acting to adjust the alignment of a saw for said spindle with the path of said carriage on said track means.

11. A concrete sawing machine according to claim 10, said carriage having another saw spindle parallel to said first mentioned spindle, said other saw spindle being driven by said driving means, said adjusting means acting to align saws for both of said spindles with the path of said carriage.

12. A concrete sawing machine comprising a vehicle having aligned track means at each side of said vehicle, each track means including parallel upper tracks and a lower guide rail, a carriage for each track means, each carriage having a roller suspension on its upper tracks and a guide roller means for its guide rail, an engine driven pair of saw spindles for each carriage, means for adjusting each of said guide roller means to adjust said saw spindles transverse to the line of travel of said carriage and means for driving said carriages.

13. A concrete sawing machine comprising a vehicle having a main frame, a track at opposite sides of said machine, a plunger means mid-way of said tracks for raising or lowering said tracks as a unit, each track having parallel track members, cooperating upright sliding supports on said frame and at each end of each track member, each track having a carriage having an engine coupled to a saw spindle means, and means for driving said carriages, each of said supports having a hinge with a horizontal hinge axis, and means for adjusting the relative tilt of said tracks to correspond to the tilt at opposite sides of a pavement.

14. A concrete sawing machine comprising a vehicle having a main frame, a track at opposite sides of said machine, a plunger means mid-way of said tracks for raising or lowering said tracks as a unit, each track having parallel track members, cooperating upright sliding supports on said frame and at each end of each track member, each track having a carriage having an engine coupled to a saw spindle means, and means for driving said carriages, said driving means comprising a tie bar between said carriages, a chain connecting said carriages, a sprocket mid-way of said chain for driving said chain, and a motor for driving said sprocket.

References Cited by the Examiner

UNITED STATES PATENTS

| | | | |
|---|---|---|---|
| 2,935,981 | 5/1960 | Middlestadt | 299—39 |
| 2,974,938 | 3/1961 | Lewis | 299—39 |
| 3,007,688 | 11/1961 | Hatcher | 299—39 |

ERNEST R. PURSER, *Primary Examiner.*